US011789222B2

(12) United States Patent
Kalavrouziotis et al.

(10) Patent No.: US 11,789,222 B2
(45) Date of Patent: Oct. 17, 2023

(54) OPTICAL COMPONENTS WITH REDUCED INTERFERENCE

(71) Applicant: Mellanox Technologies, Ltd., Yokneam (IL)

(72) Inventors: Dimitrios Kalavrouziotis, Papagou (GR); Sylvie Rockman, Yokneam (IL); Elad Mentovich, Tel Aviv (IL); Tamir Sharkaz, Kfar Tavor (IL); Yaakov Gridish, Yoqneam Ilit (IL); Anna Sandomirsky, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 98 days.

(21) Appl. No.: 17/341,645

(22) Filed: Jun. 8, 2021

(65) Prior Publication Data

US 2022/0163740 A1    May 26, 2022

(30) Foreign Application Priority Data

Nov. 20, 2020 (GR) .............................. 20200100694

(51) Int. Cl.
*G02B 6/42* (2006.01)
*H04B 10/50* (2013.01)

(52) U.S. Cl.
CPC ......... *G02B 6/4277* (2013.01); *G02B 6/4206* (2013.01); *H04B 10/501* (2013.01)

(58) Field of Classification Search
CPC ....................................................... G02B 6/42

USPC ........................................................... 385/14
See application file for complete search history.

(56) References Cited

U.S. PATENT DOCUMENTS

| 5,668,386 | A | * | 9/1997 | Makiuchi | ............ | H01L 27/1465 |
| | | | | | | 257/745 |
| 5,883,996 | A | * | 3/1999 | Knapp | .................... | G02B 6/423 |
| | | | | | | 385/88 |
| 6,103,398 | A | * | 8/2000 | Norton | ................. | G02B 6/4204 |
| | | | | | | 385/94 |
| 2022/0238604 | A1 | * | 7/2022 | Kim | ....................... | H10K 30/88 |

FOREIGN PATENT DOCUMENTS

CN          106886767 A  *  6/2017  ............. G02B 27/30

* cited by examiner

*Primary Examiner* — Kaveh C Kianni
(74) *Attorney, Agent, or Firm* — Moore & Van Allen PLLC; Michael M. McCraw (57) ABSTRACT

Optical components and associated methods of manufacturing are provided. An example optical component includes a body defined by an optical interposer substrate and a passivation layer applied to the optical interposer substrate. The optical interposer substrate defines a first surface of the body, and the passivation layer defines a second surface of the body opposite the first surface. The passivation layer includes a metallic shielding element configured to prevent interference between the first surface and the second surface. The optical component further includes an opening extending from the second surface to the optical interposer substrate, the opening defining an optical path through the passivation layer. The optical interposer substrate receives an optical signal from an optical transmitter supported by the second surface via the optical path.

20 Claims, 11 Drawing Sheets

OPTICAL COMPONENTS WITH REDUCED INTERFERENCE

CROSS-REFERENCE TO RELATED APPLICATIONS

This application claims priority to Greek Patent Application No. 20200100694, filed Nov. 20, 2020, which application is incorporated by reference herein in its entirety.

TECHNOLOGICAL FIELD

Example embodiments of the present disclosure relate generally to communication systems and, more particularly, to optical components with reduced interference.

BACKGROUND

Datacenters and other networking environments (e.g., datacom, telecom, and/or other similar data/communication networks) may include connections between switch systems, servers, racks, and other devices in order to provide for signal transmission between one or more of these elements. The connection mechanisms used by traditional components, however, often fail to support the increasing bandwidth demands associated with emerging networking systems. Applicant has identified a number of deficiencies and problems associated with conventional optical components and associated network communication devices. Through applied effort, ingenuity, and innovation, many of these identified problems have been solved by developing solutions that are included in embodiments of the present disclosure, many examples of which are described in detail herein.

BRIEF SUMMARY

Apparatuses, systems, and associated methods or manufacturing are provided for improved optical components with reduced interference. An example optical component may include a body defined by an optical interposer substrate defining a first surface of the body. The body may be further defined by a passivation layer applied to the optical interposer substrate defining a second surface of the body opposite the first surface. The passivation layer may include a metallic shielding element configured to prevent interference between the first surface and the second surface. The optical component may further include an opening extending from the second surface to the optical interposer substrate. The opening may define an optical path through the passivation layer.

In some embodiments, the metallic shielding element may be embedded in the passivation layer.

In some embodiments, the optical component may further include an optical transmitter supported by the second surface of the body and configured to generate optical signals.

In some further embodiments, the optical interposer substrate may be configured to receive an optical signal from the optical transmitter via the optical path, and the optical interposer may be configured to collimate or shape the optical signal.

In some further embodiments, the optical component may include driving circuitry supported by the second surface of the body and communicably coupled with the optical transmitter via one or more transmission lanes.

In some embodiments, the optical component may include an optical coupler supported by the first surface of the body and in optical communication with the optical transmitter via the optical path.

In any embodiment, the metallic shielding element may define an integrated lens positioned within the opening and along the optical path.

In any embodiment, the metallic shielding element may define a one-dimensional (1D) metallic grating positioned within the opening and along the optical path.

In any embodiment, the metallic shielding element may define a two-dimensional (2D) metallic grating positioned within the opening and along the optical path.

In any embodiment, the metallic shielding element may define a circular metallic grating positioned within the opening and along the optical path.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As noted above and described hereafter, networking systems, such as those found in datacenters, may establish inter-rack connections between racks and intra-rack connections between networking boxes, printed circuit boards (PCBs), and the like located within the same rack. These connections often rely upon transceivers, processors, chipsets, PCBs, connectors, networking cables, optical cable assemblies, copper cable assemblies, and associated communication system components to establish these connections. For example, Quad Small Form-factor Pluggable (QSFP) connectors and cables (e.g., QSFP+, QSFP28, QSFP56, QSFP112, etc.) as well as other forms of connectors such as Small Form Pluggable (SFP) connectors (e.g., as SFP+, SFP28, SFP56, SFP112, etc.) and C-Form-factor Pluggable (CFP) connectors, have long been the industry standard for providing high-speed information operations interface interconnects. More recently, Octal Small Form-factor Pluggable (OSFP) and Quad Small Form Factor Pluggable Double Density (QSFP-DD) transceivers have emerged to provide increased bit rate capabilities. Regardless of the type of optical cable connector, module, or transceiver used, the systems that employ these devices are continually attempting to overcome bandwidth limitations associated with networking connections in order to comply with emerging requirements and specifications.

As described herein, well-established manufacturing and assembly techniques are therefore required to be reevaluated in order to accommodate connections with increased bandwidth requirements. For example, transceivers that support optoelectronic components (e.g., photodiodes, vertical-cavity surface-emitting lasers (VCSELs), and/or the like) and integrated circuits (ICs) may provide electrical connections to these components by relying upon wire bond connections. In order to comply with data speed and bandwidth demands, however, these conventional systems are required to provide optimized geometries or modified package designs. For example, optoelectronic components and/or ICs may be positioned in cavities defined by a substrate (e.g., printed circuit boards (PCBs)) or elevated via spacers to reduce connection distance (e.g., to achieve shortened connection length). The use of these modifications, however, are not only complex in design but are further expensive to produce. Furthermore, such modifications are proving incapable of providing the necessary bandwidth for emerging connection requirements.

Flip-chip assemblies that rely upon optical interposers have been proposed as an alternative to wire bond connections. These interposers may rely upon on coplanar radio frequency (RF) lines and small connection bumps as opposed to wire bonds. Although prior proposed interposer designs are thought capable of providing increased performance, optical interposers have not been widely adopted in VCSEL transceiver products due to the cost associated with producing these components and the challenges associated with optical alignment with interposers. In other words, conventional attempts at utilizing interposers in transceiver designs have been unsuccessful due to the increased costs (e.g., due to post processing steps) and alignment issues associated with dielectric (e.g., glass or polymer) couplers used with these designs.

In order to address these issues and others, the embodiments of the present disclosure provide optical components that instead leverage optical interposer substrates and metallic optical couplers to provide high bandwidth connections. As described hereafter, the optical components of the present disclosure may leverage an optical interposer substrate with a passivation layer disposed thereon. The passivation layer may define a surface of the component that supports one or more optoelectronic components, such as a VCSEL, and IC components, such as driving circuitry. The optical interposer substrate may define another surface of the optical component (e.g., opposite the surface defined by the passivation layer) that supports, for example, an optical coupler (e.g., a metallic optical coupler). An opening extending through the body defined by the optical interposer and passivation layer may define an optical path along which signals generated by the optoelectronic components of one surface are provided to the optical coupler of the other surface for further transmission to other networking devices.

The embodiments of the present disclosure address the aforementioned deficiencies of prior designs by employing metallic couplers that may be easily and accurately manufactured using cost effective techniques (e.g., metal stamping or the like) as opposed to dielectric couplers. Due to the conductive nature of metallic couplers, however, these connections may operate to provide interference when placed in close proximity to high-speed optoelectronic components. Therefore, the embodiments of the present disclosure also employ a metallic shielding element within the passivation layer so as to remove or otherwise reduce interference associated with these metallic couplers. In this way, the embodiments of the present disclosure may further reduce the dimensions (e.g., thickness of the optical component body) resulting in improved communication by reducing the distance traveled by optical signals generated on one side of the body and transmitted to optical couplers on an opposing side of the body. Still further, the use of a metallic shielding element within the passivation layer provides new opportunities to introduce additional components (e.g. a lens, metallic grating, etc.) that may operate to further enhance optical signal transmission (e.g., reducing optical signal divergence during transmission).

Optical Component with Reduced Interference

Figure 1:
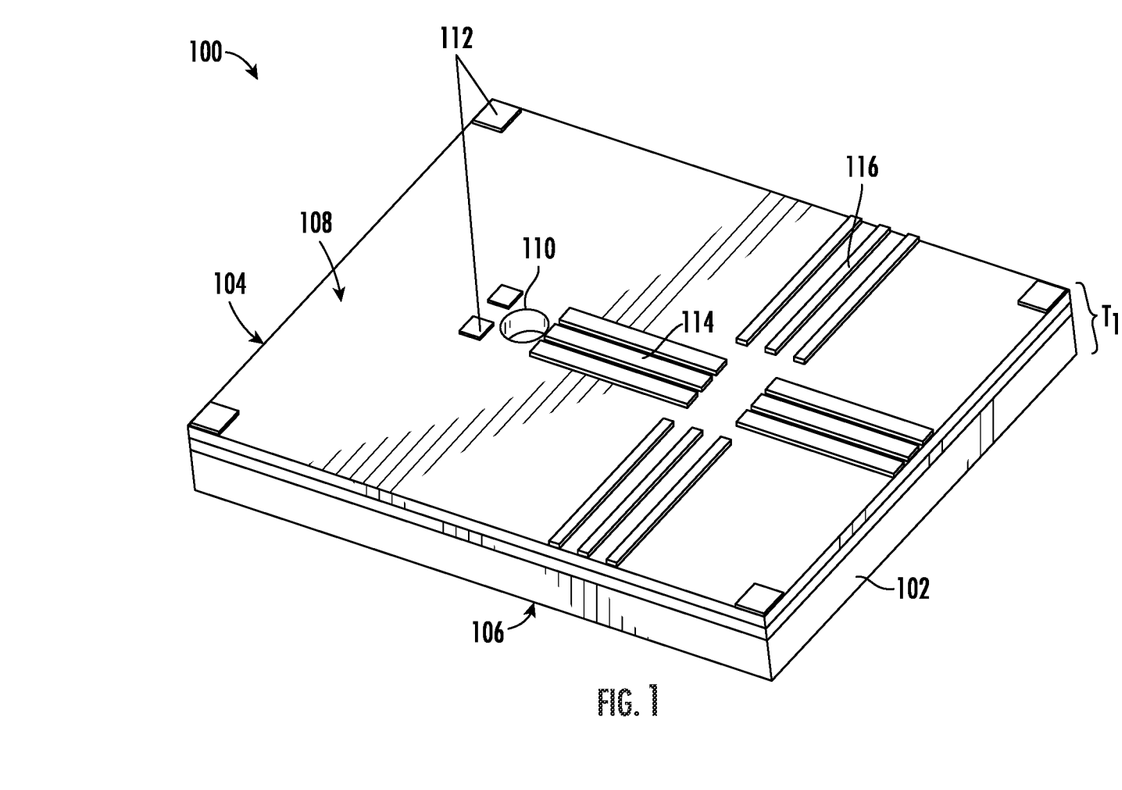
FIG. 1 illustrates an example optical component in accordance with some embodiments described herein.

With reference to FIG. 1, an example optical component 100 of the present disclosure is illustrated. As shown, the optical component 100 may include an optical interposer substrate 102 that defines a first surface 106 of the body of the optical component 100. Additionally, the optical component 100 may include a passivation layer 104 applied to the optical interposer substrate 102 that defines a second surface 108 of the optical component 100. The combined optical interposer substrate 102 and passivation layer 104 applied thereon may define a body of the optical component 100 having a thickness $T_1$.

The optical interposer substrate 102 of the optical component 100 may be formed as a glass substrate capable of transmitting optical signals (e.g., allowing optical signals to pass therethrough). The optical interposer substrate 102 may be, for example, formed of a substantially homogenous of otherwise uniform structure so as to facilitate optical signal transmission (e.g., reduce optical signal divergence). Additionally, the optical interposer substrate 102 may define surfaces that are substantially flat or otherwise define a body that is of uniform thickness. To facilitate this uniformity, the optical interposer substrate 102 may be subjected to one or more coatings in order to ensure a high surface quality for signal transmission. Although described herein with reference to a glass material having a thickness (e.g. thickness $T_2$ in FIG. 3), the present disclosure contemplates that the optical interposer substrate 102 may be formed of any material through which optical signals may be transmitted (e.g., silicon, polymers, etc.). Additionally, the optical interposer substrate 102 may be dimensioned (e.g., sized and shaped) based upon the intended application of the optical component 100. The optical interposer substrate 102 may define the first surface 106 of the optical component 100 and support an optical coupler (e.g. optical coupler 400 in FIG. 4) as described hereafter with reference to FIGS. 4-5.

With continued reference to FIG. 1, the optical component 100 may include a passivation layer 104 that defines the second surface 108 of the optical component 100 body. The passivation layer 104 may be applied to the optical interposer substrate 102 via the planar process, surface passivation, thermal oxidation, and/or the like in order to provide a layer of material that shields the optical interposer substrate 102 and is capable of supporting optoelectronic components thereon. The present disclosure contemplates that the passivation layer 104 may refer to a collection of layers that are applied to the optical interposer substrate 102 such that, as described hereafter with reference to FIG. 3, a metallic shielding element (e.g., metallic shielding element 300) may be disposed within the passivation layer 104. The present disclosure contemplates that the passivation layer 104 may be formed of any material capable of supporting optoelectronic components and may further be dimensioned (e.g., sized and shaped) based upon the intended application of the optical component 100.

Figure 6:
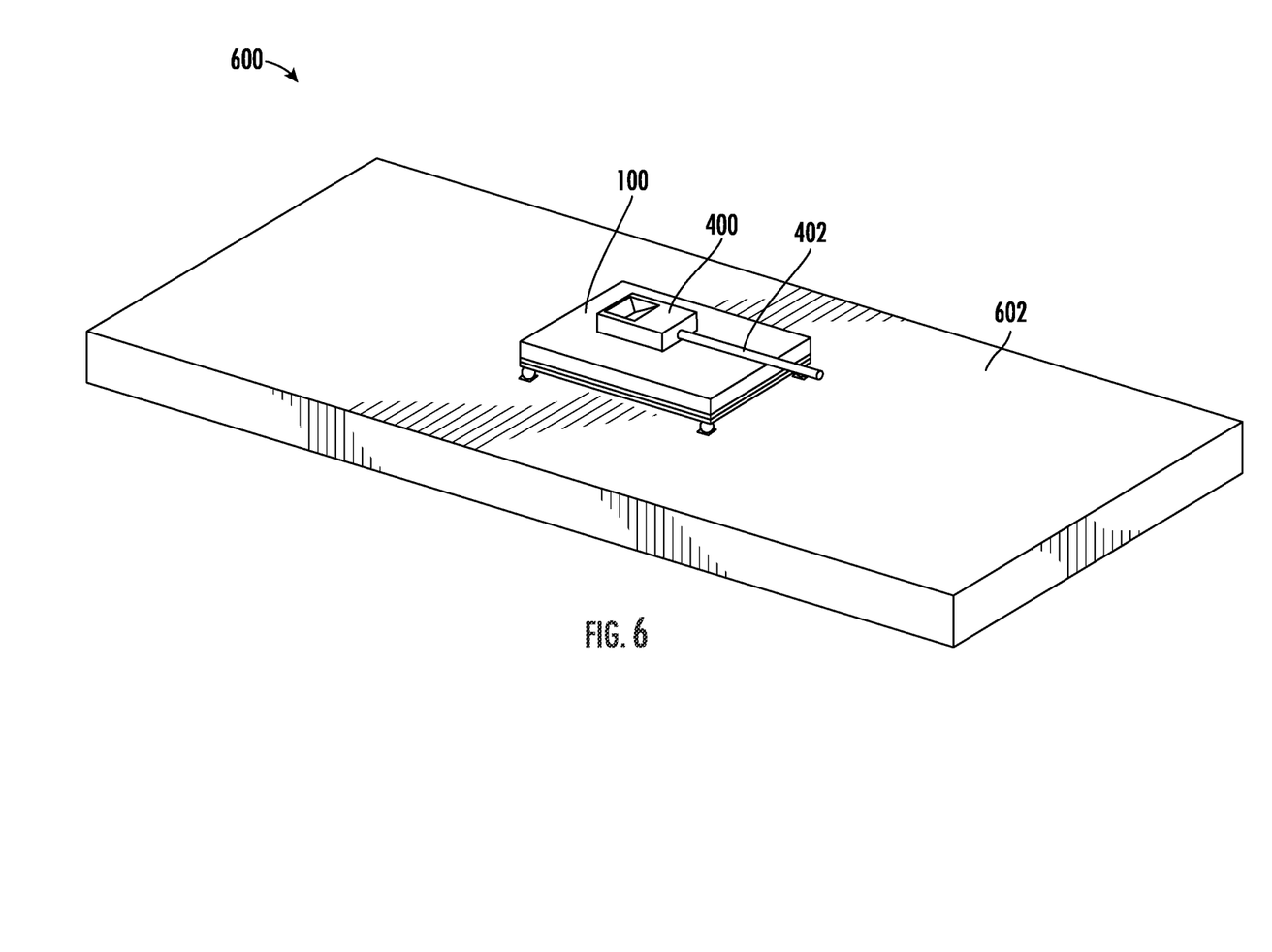
FIG. 6 illustrates a transceiver that includes an example optical component of the present disclosure in accordance with embodiments described herein.
Figure 7:
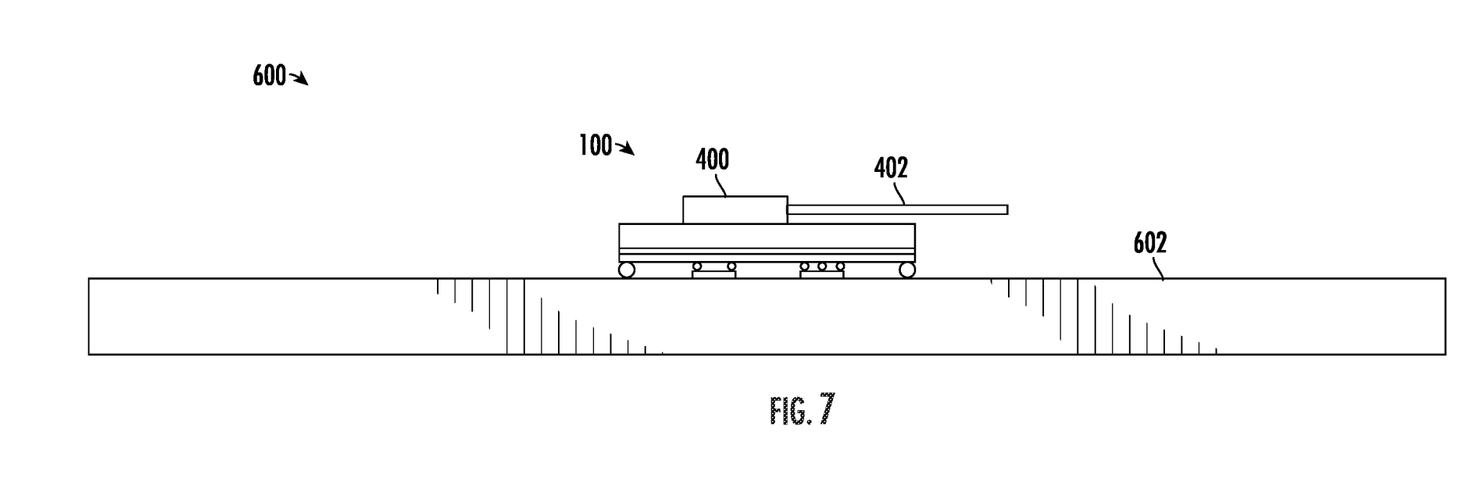
FIG. 7 illustrates a side view of the transceiver of FIG. 6 in accordance with embodiments described herein.

The second surface 108 defined by the passivation layer 104 may define various components configured to provide electrical connectivity and/or to provide electrical communication to optoelectronic components supported thereon. By way of example, the second surface 108 may support one or more electrical connection pads 112 configured to provide electrical communication between the passivation layer 104 and a VCSEL connected thereto. By way of an additional example, in operation as shown in FIGS. 6-7, the optical component 100 may be formed as a flip-chip device such that the second surface 108 is disposed proximate a corresponding substrate (e.g., PCB 602 or the like) of a transceiver (e.g., transceiver assembly 600). In such an embodiment, the electrical connection pads 112 may provide electrical connectivity between the corresponding substrate of the transceiver and the optical component 100.

Figure 2:
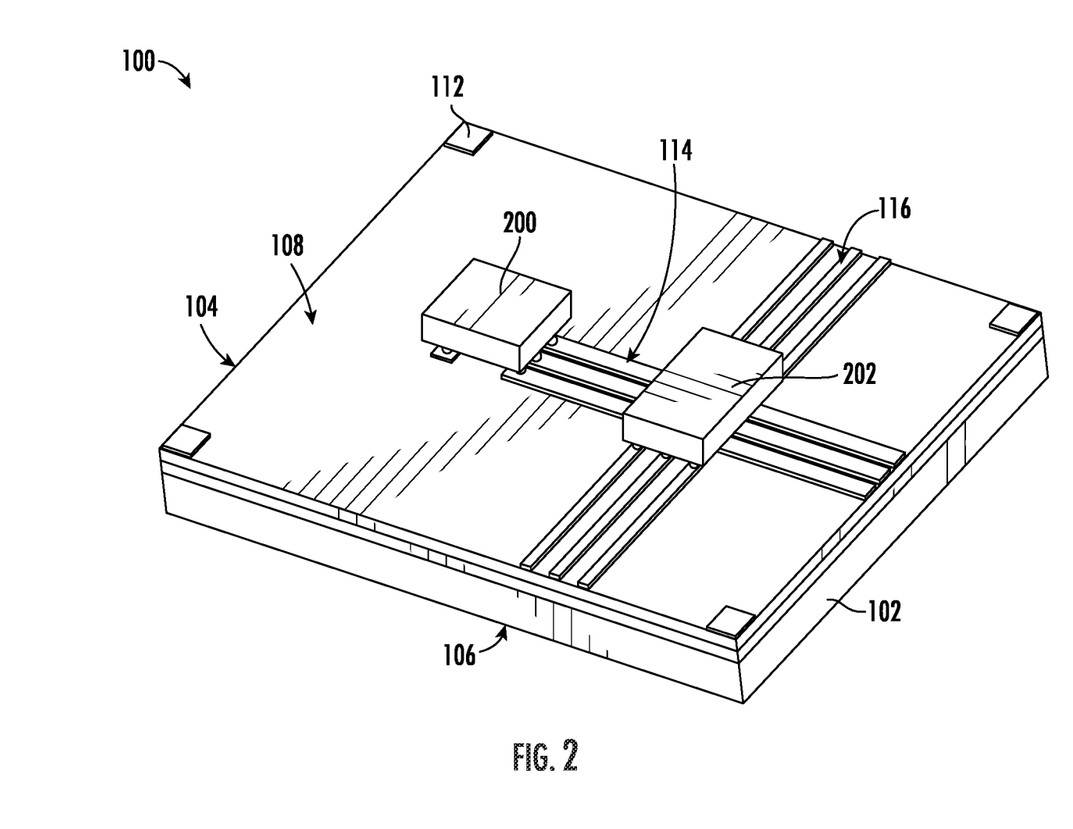
FIG. 2 illustrates the optical component of FIG. 1 with an optical transmitter and driving circuitry in accordance with embodiments described herein.
Figure 3:
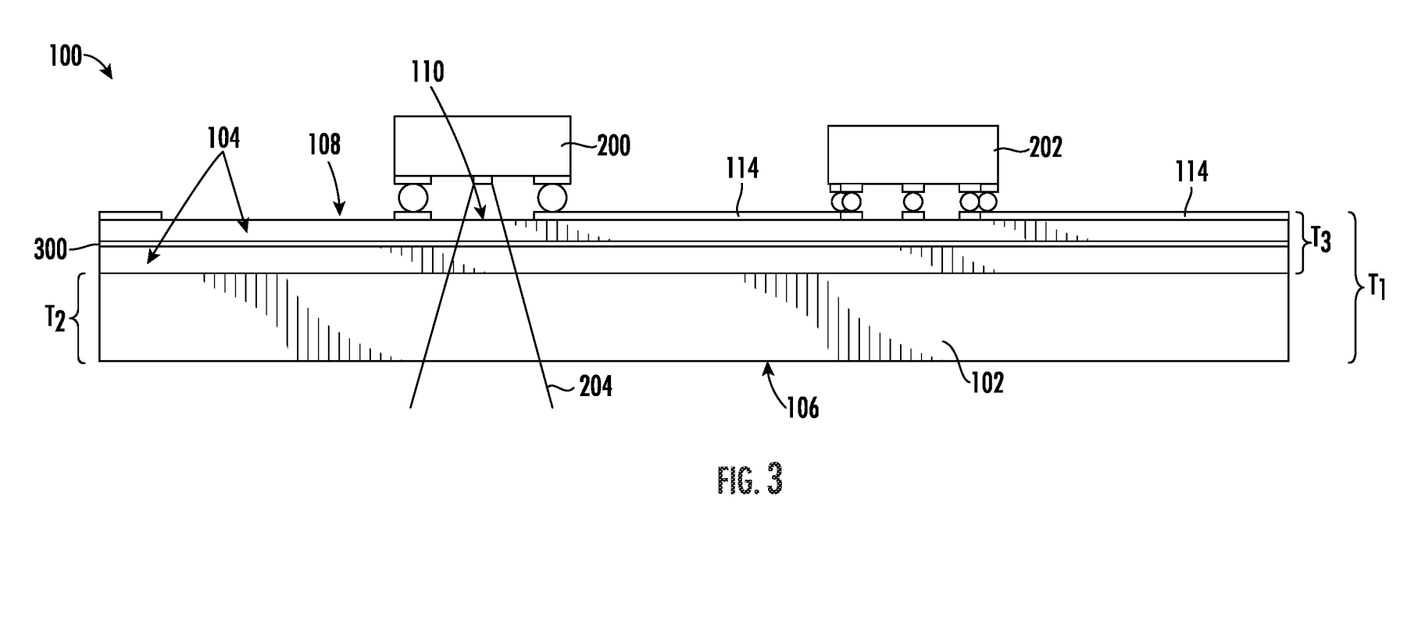
FIG. 3 is a side view of the optical component of FIG. 2 in accordance with embodiments described herein.

The second surface 108 of the passivation layer 104 may further define one or more electrical traces or transmission lanes 114, 116 configured to provide for the transmission of electrical signals between optoelectronic components. As shown in FIGS. 2-3, the transmission lanes 114 may, for example, provide for high-speed electrical communication between an optical transmitter 200 and driving circuitry 202. The transmission lanes 116 may, for example, provide for low-speed electrical communication to the optoelectronic components of the second surface 108 (e.g., provide power or operating instructions as opposed to high-speed data transmission). Although described herein with reference to transmission lanes, the present disclosure contemplates that electrical connectivity may be provided to the optoelectronic components described hereinafter via any mechanism or feature of the passivation layer 104.

The passivation layer 104 may further define an opening 110 that extends from the second surface 108 to the optical interposer substrate 102. As described hereafter, the optoelectronic components supported by the second surface 108 may be configured to generate optical signals. In order for the generated optical signals to pass through the body of the optical component 100, the optical signals may be directed towards the opening 110. As shown in FIG. 3, for example, the opening 110 may extend the thickness $T_3$ of the passivation layer 104. The opening 110 may further extend through the metallic shielding element 300 described hereafter so as to allow optical signals to pass through the metallic shielding element 300. Although illustrated and described herein with reference to a cylindrical opening, the present disclosure contemplates that the opening 110 may be dimensioned (e.g., sized and shaped) based upon the intended application of the optical component 100 and/or based upon any optoelectronic component used in conjunction with the opening 110.

With reference to FIGS. 2-3, the second surface 108 defined by the passivation layer 104 may support the optical transmitter 200. The optical transmitter 200 may be configured to generate optical signals that may, as described hereafter, travel along an optical path 204. By way of example, the optical transmitter 200 may include a VCSEL configured to generate optical signals that may be transmitted through the passivation layer 104 via the opening 110 along the optical path 204. The optical transmitter 200 may be configured to generate optical signals at any wavelength based upon the intended application of the optical component 100. Although described hereinafter with reference to an optical transmitter 200 (e.g., a VCSEL), the present disclosure contemplates that the optical transmitter 200 may operate as an optical receiver (e.g. photodiode) or optical transceiver configured to receive optical signals. By way of example, an optical signal traveling along the optical path 204 may also be received by an optical transceiver.

The passivation layer 104 may also support the driving circuitry 202. By way of example, the driving circuitry 202 may be supported by one or more electrical contacts (e.g., contacts 112 or the like) and may be in electrical communication with the optical transmitter 200 described above via transmission lanes 114. The driving circuitry 200 may further be in electrical communication with one or more other networking components or devices (not shown) via the transmission lanes 114, 116. By way of example, the driving circuitry 202 may include circuitry, networked processors, or the like configured to, in whole or in part, control operation of the optical transmitter 200. The driving circuitry 202 may include a controller, microcontroller, programmable logic controller (PLC), processor, or other computing device. For example, the driving circuitry 202 may include a processor (and/or co-processor or any other processing circuitry assisting or otherwise associated with the processor) in communication with a memory for passing information among components of the driving circuitry 202. Such a memory may be non-transitory and may include, for example, one or more volatile and/or non-volatile memories. For example, the memory may be an electronic storage device (e.g., a non-transitory computer readable storage medium). The memory may be configured to store information, data, content, applications, instructions, or the like, for enabling the driving circuitry 202 to carry out various functions in accordance with example embodiments of the present disclosure. The driving circuitry 202 may, via a processor or otherwise, be configured to execute instructions stored in a memory or otherwise accessible to the processor.

By way of a particular example, the driving circuitry 202 may receive instructions, via transmission lanes 114, 116 or may generate instructions for controlling operation of the optical transmitter 200. As such, the driving circuitry 202 may transmit these instructions as electrical signals via the transmission lanes 114 to the optical transmitter 200 causing the optical transmitter 200 to generate an optical signal. Such an optical signal may be output by the optical transmitter along optical path 204 for receipt by components supported by the first surface 106 defined by the optical interposer substrate 102 as described hereafter. The optical interposer substrate 102 may further operate to collimate or shape the optical signal received via the optical path 204.

Figure 4:
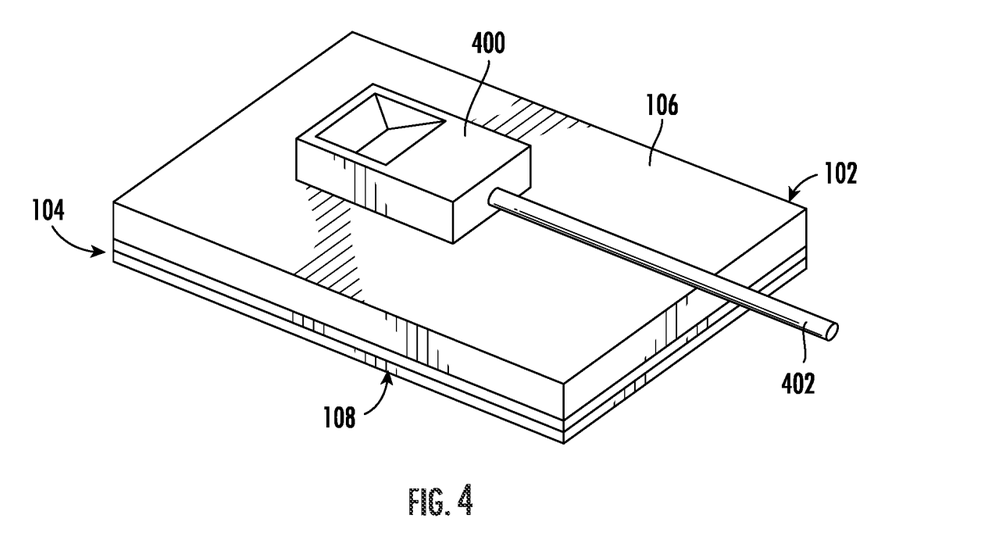
FIG. 4 illustrates the optical component of FIG. 1 with an optical coupler and optical communication medium in accordance with embodiments described herein.
Figure 5:
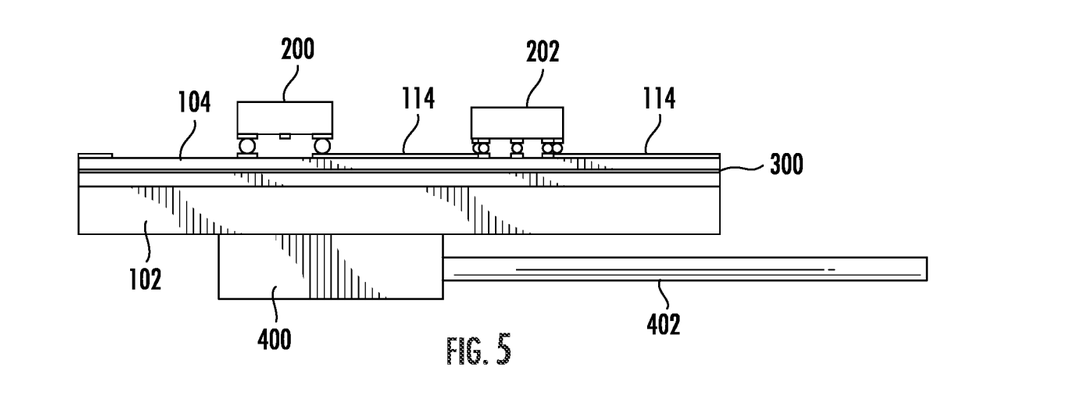
FIG. 5 is a side view of the optical component of FIG. 4 in accordance with embodiments described herein.

With reference to FIGS. 4-5, the first surface 106 defined by the optical interposer substrate 102 may support an optical coupler 400. As described above, the optical coupler 400 may, for example, be metallic (e.g., formed via metal stamping or the like) so as to reduce the manufacturing costs associated with this component relative to conventional dielectric couplers. The optical coupler 400 may be positioned relative the optical transmitter 200 of the second surface 108 defined by the passivation layer 104 so as to be substantially aligned with the optical path 204. In this way, the optical coupler 400 may be in optical communication with the optical transmitter 200 via the optical path 204. The optical coupler 400 may also support or otherwise be in optical communication with an optical communication medium 402 (e.g., a collection of optical fibers or the like). In operation, the optical transmitter 200 (e.g., a VCSEL) may generate an optical signal, in response to instructions from the driving circuitry 202 or otherwise, that may be output by the optical transmitter 200 along the optical path 204. The optical signal may travel along the optical path 204 through the opening 110 and enter the optical interposer substrate 102. The optical signal may travel through the optical interposer substrate 102 and be received by the optical coupler 400. The optical coupler 400 may direct the optical signal to the optical communication medium 402 for transmission to one or more other networking devices in optical communication with the optical communication medium (not shown).

Additionally or alternatively, the optical communication medium 402 may transmit an optical signal that is received by the optical coupler 400. The optical coupler 400 may direct the optical signal into the optical interposer substrate 102, and the optical signal may exit the optical interposer substrate 102 at the opening 110 and travel along the optical path 204 to the optical transmitter 200 (e.g., operating as an optical receiver or transceiver). The optical signal may be converted by the optical transmitter 200 (e.g., a photodiode of an optical receiver or transceiver) to corresponding electrical signals that may be further provided, via the transmission lanes 114, to the driving circuitry 202.

As described above, the use of a metallic optical coupler 400 on the first surface 106 of the optical interposer substrate 102 may provide for reduced manufacturing costs and may avoid the alignment issues associated with dielectric (e.g., glass or polymer) couplers. The metallic optical coupler 400, however, may cause electromagnetic interference (e.g., crosstalk or the like) due to the conductive nature of the metallic optical coupler 400. In order to reduce or otherwise prevent this interference, the passivation layer 104 may include a metallic shielding element 300 configured to prevent interference between the first surface 106 and the second surface 108. As shown in FIGS. 3 and 5, the metallic shielding element 300 may be embedded in the passivation layer 104, such as by being positioned or otherwise disposed between one or more layers that form the passivation layer 104. The metallic shielding element 300 may, for example, comprise a grounded metallic film that extends through the passivation layer 104. Said differently, the present disclosure contemplates that the metallic shielding element 300 may be positioned in a plane substantially parallel with respect to the first surface 106 and the second surface 108 and may further extend to each of the exterior edges of the body of the optical component 100. As described above, the opening 110 in the passivation layer 104 may extend through the metallic shielding element 300 so as to allow optical signals to pass therethrough. Although described herein with reference to a grounded metallic film, the present disclosure contemplates that the metallic shielding element 300 may be formed of any material that operates to reduce or prevent electromagnetic interference between the first surface 106 and the second surface 108.

By utilizing the metallic shielding element 300, the overall thickness $T_1$ of the optical component 100 may be reduced. For example, in components that lack the metallic shielding element 300 but attempt to use metallic optical couplers 400, the thickness $T_1$ of the optical component (e.g., the thickness $T_2$ of the optical interposer substrate 102 and/or the thickness $T_3$ of the passivation layer 104) may be increased so as to increase the distance between the metallic optical coupler 400 and the optical transmitter 200 and, therefore, reduce the interference between these components. The use of the metallic shielding element 300, however, reduces or prevents this interference such that the thickness $T_1$ of the optical component 100 may be reduced. In doing so, the optical coupler 400 of the present disclosure may operate to improve the signal transmission provided by the optical component 100. In other words, reducing the thickness $T_1$ of the optical component 100 also reduces the distance an optical signal transmitted by the optical transmitter 200 must travel. Such a reduction in distance may operate to reduce the optical coupling loses of the system (e.g., reduce optical signal divergence). As shown in FIG. 5-6 and as described above, the optical component 100 may be assembled as part of a transceiver assembly 600 in which the optical component 100 is positioned as a flip-chip component. By reducing the thickness $T_1$ of the optical component 100, the overall size of the transceiver assembly 600 may be further reduced resulting in a more compact assembly relative to conventional assemblies.

Figure 8:
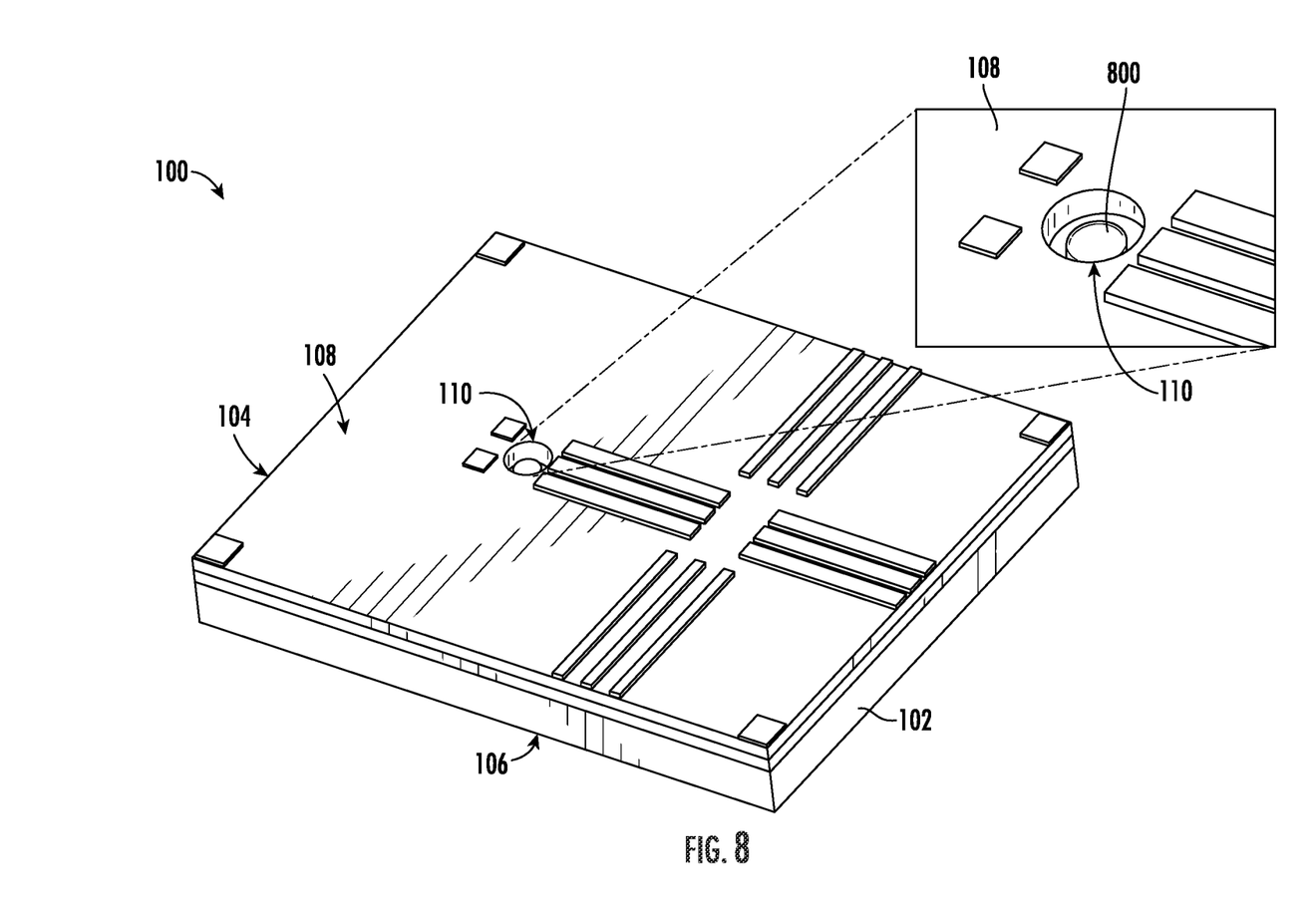
FIG. 8 illustrates an example optical component with an integrated lens in accordance with embodiments described herein.

With reference to FIGS. 8-11, the use of a metallic shielding element 300 may, in some embodiments, provide opportunities to further improve signal transmission. As shown in FIG. 8, the metallic shielding element 300 may further define an integrated lens 800 positioned within the opening 110 and along the optical path 204. As opposed to traditional designs that may rely upon lens assemblies that are located external to the optical component 100, the integrated lens 800 may be formed during the fabrication of the optical component such that the integrated lens 800 is embedded in the optical component 100. The integrated lens 800 may operate to at least partially collimate the optical signal generated by the optical transmitter 200. In doing so, the integrated lens 800 may operate to reduce the performance requirements associated with the optical coupler 400. For example, the divergence angle of the optical signal may be reduced by passing through the integrated lens 800, such that the precision associated with the manufacturing tolerances and/or positioning of the optical coupler 400 may be reduced.

Figure 9:
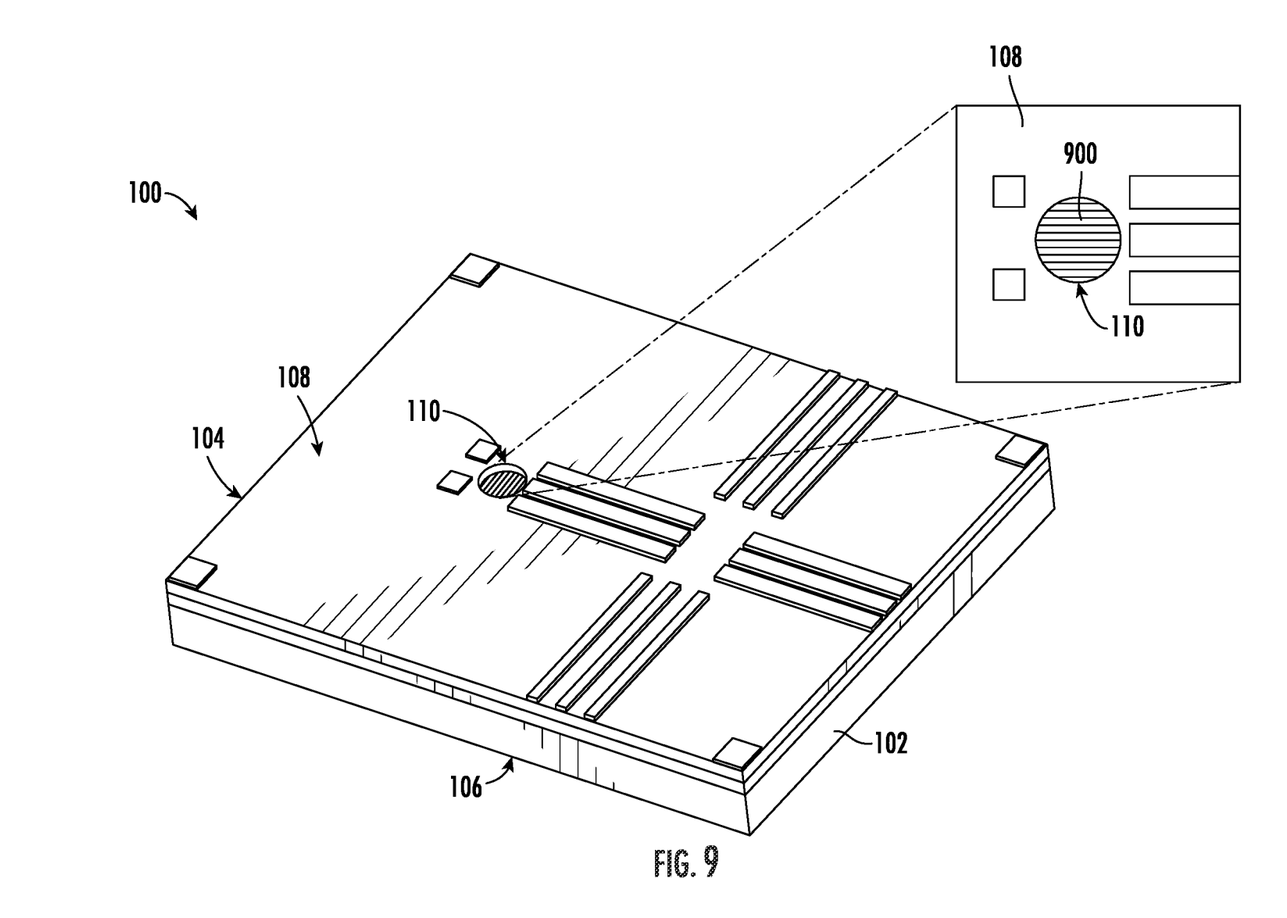
FIG. 9 illustrates an example optical component with a one-dimensional (1D) metallic grating in accordance with embodiments described herein.
Figure 10:
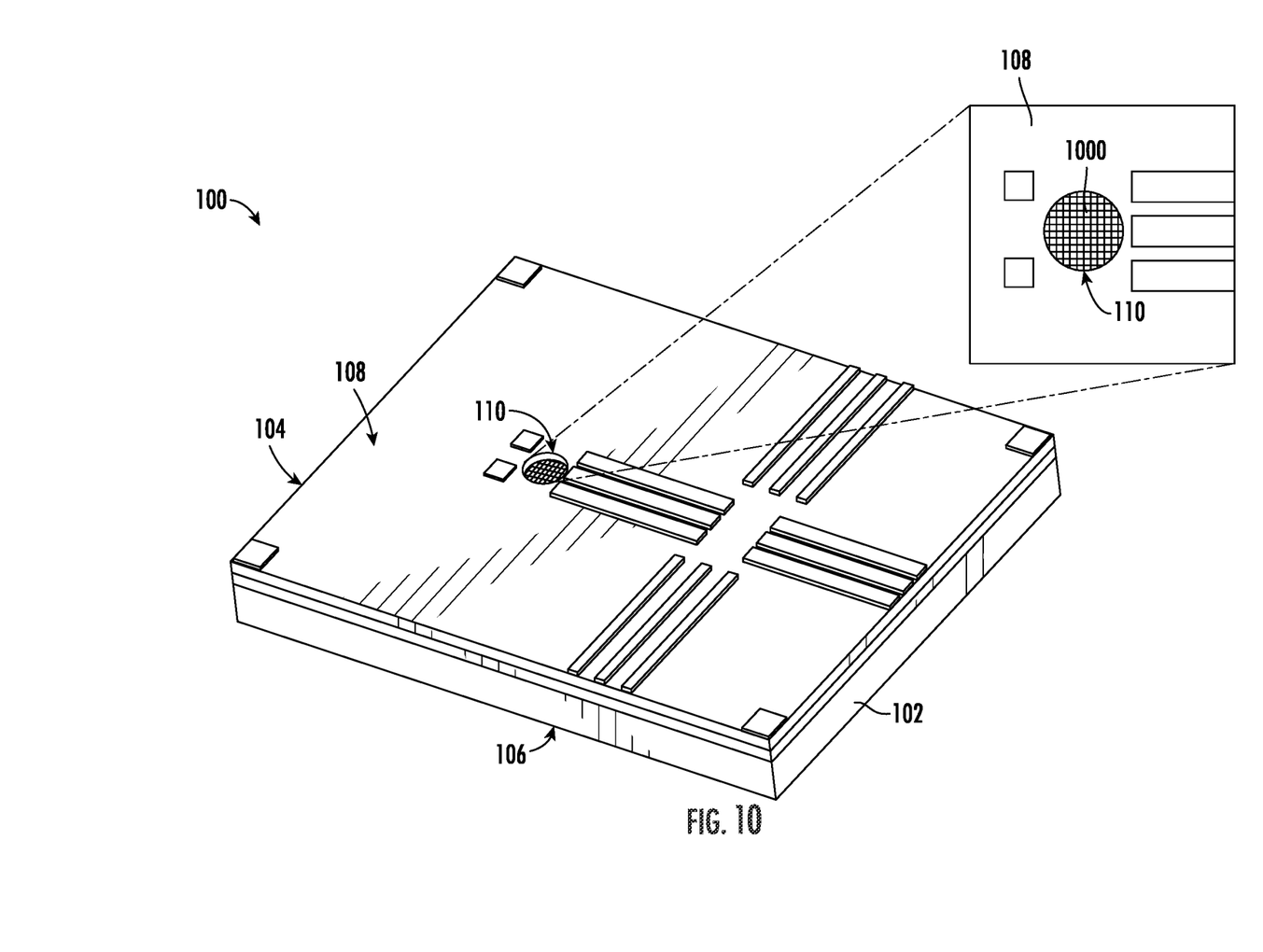
FIG. 10 illustrates an example optical component with a two-dimensional (2D) metallic grating in accordance with embodiments described herein.
Figure 11:
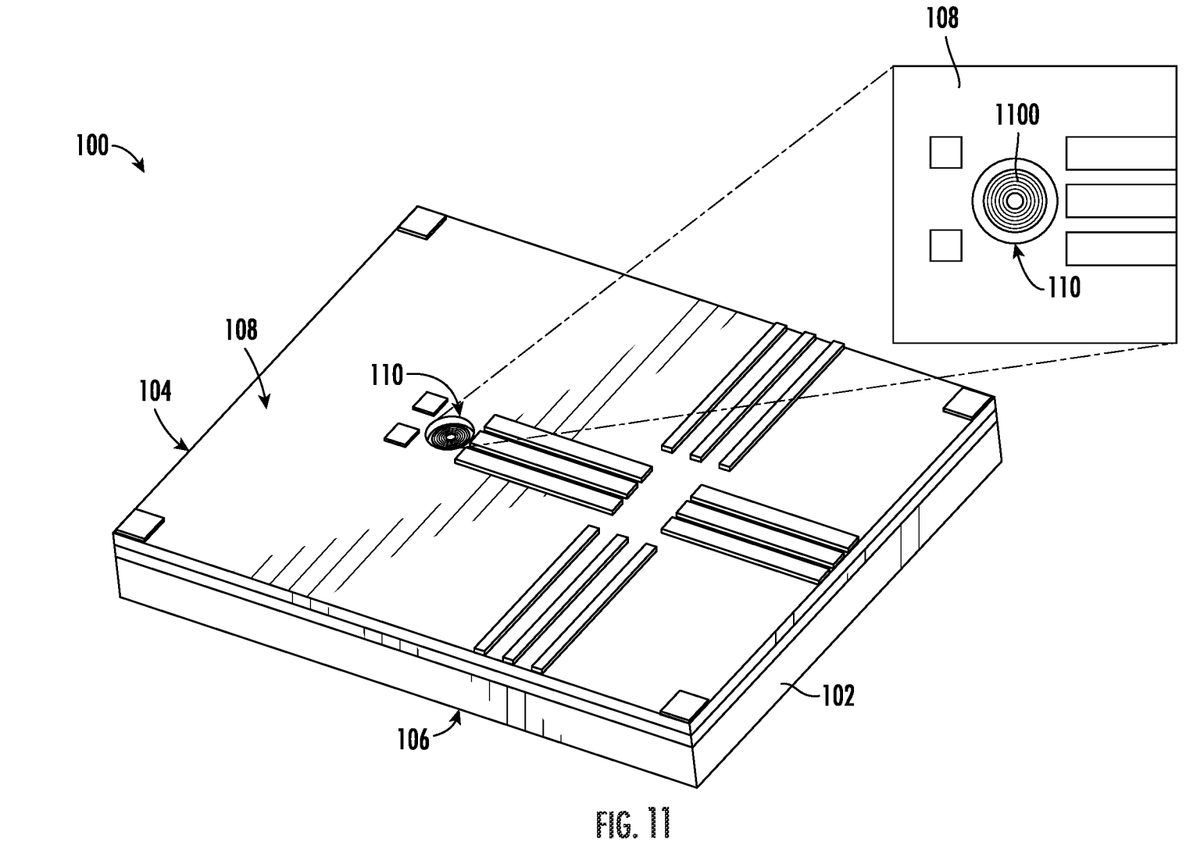
FIG. 11 illustrates an example optical component with a circular metallic grating in accordance with embodiments described herein.

Additionally or alternatively, the metallic shielding element 300 may define a one-dimensional (1D) metallic grating 900 as shown in FIG. 9 or a two-dimensional (2D) metallic grating 1000 as shown in FIG. 10 within the opening 110 and along the optical path 204. The 1D metallic grating 900 may operate to tilt or modify the ellipticity of the optical signal generate by the optical transmitter 200, and, similarly, the 2D metallic grating 1000 may operate to tilt or change the shape of the optical signal in two-dimensional space. These gratings 900, 1000 may operate to at least partially collimate or shape the optical signal transmitted by the optical transmitter 200. Furthermore, the gratings may operate to tune operation of the optical transmitter 200. By way of example, the 1D metallic grating 900 may operate to reflect a portion of one polarization state of the optical signal generated by the optical transmitter 200 so as to lock the polarization of the optical transmitter (e.g., enabling single-polarization operation). Additionally or alternatively, the metallic shielding element 300 may define a circular metallic grating 1100 positioned within the opening 110 and along the optical path 204. In addition to the partial collimation or shaping operations described above with reference to the gratings 900, 1000 of FIGS. 9-10, the circular metallic grating 1100 may operate to perform mode filtering or phase masking operations. In doing so, the circular grating 1100 may improve the quality of the topical signal and/or change the modal distribution of multimode signals to improve the transmission characteristics of these signals.

Example Methods of Manufacturing

Figure 12:
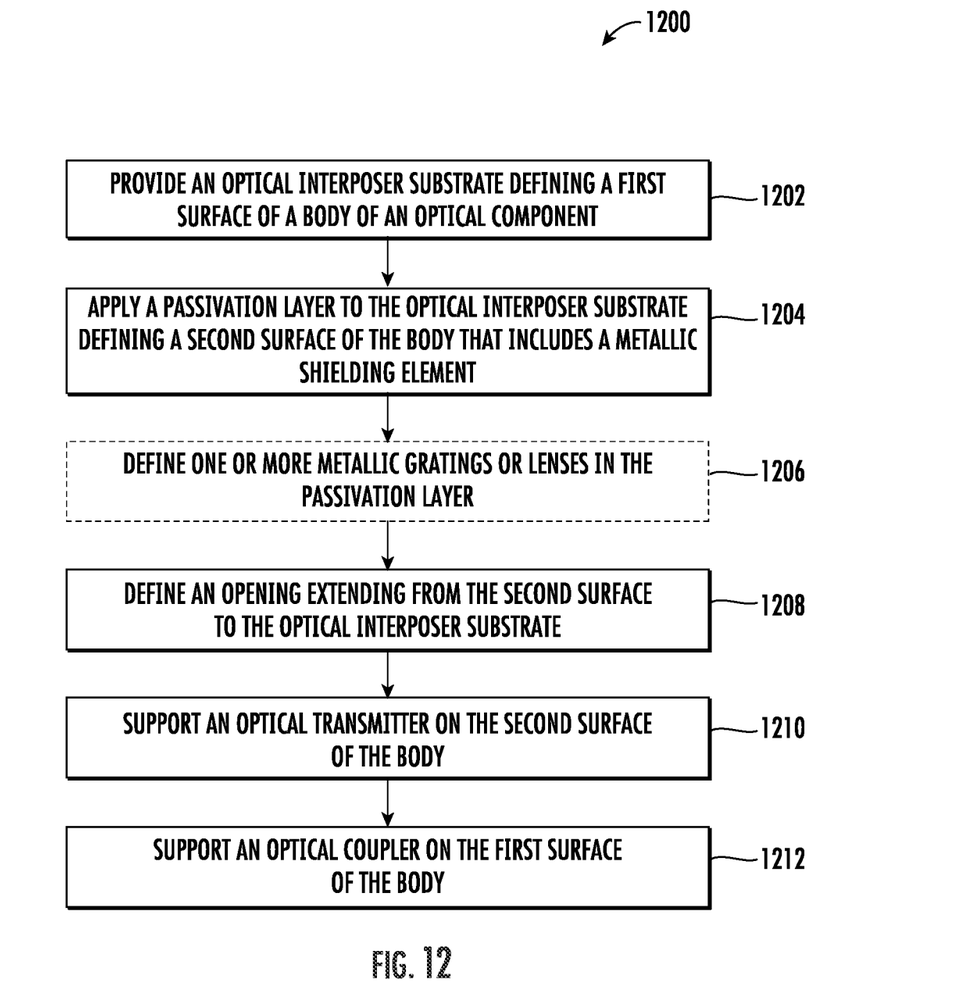
FIG. 12 is a flowchart illustrating an example method of manufacturing an optical component of the present disclosure in accordance with embodiments described herein.

With reference to FIG. 12, a method of manufacturing an optical component is illustrated. The method (e.g., method 1200) may include the step of providing an optical interposer substrate defining a first surface of a body of an optical component at operation 1202. As described above, the optical interposer substrate of the optical component may be formed as a glass substrate capable of transmitting optical signals (e.g., allowing optical signals to pass therethrough). The optical interposer substrate may be, for example, formed of a substantially homogenous of otherwise uniform structure so as to facilitate optical signal transmission (e.g., reduce optical signal divergence). Additionally, the optical interposer substrate may define surfaces that are substantially flat or otherwise define a body that is of uniform thickness. To facilitate this uniformity, the optical interposer substrate may be subjected to one or more coatings in order to ensure a high surface quality for signal transmission. The present disclosure contemplates that the optical interposer substrate may be formed of any material through which optical signals may be transmitted (e.g., silicon, polymers, etc.). Additionally, the optical interposer substrate may be dimensioned (e.g., sized and shaped) based upon the intended application of the optical component.

The method 1200 may further include applying a passivation layer to the optical interposer substrate defining a second surface of the body that includes a metallic shielding element at operation 1204. As described above, the optical component may include a passivation layer that defines the second surface of the optical component body. The passivation layer may be applied to the optical interposer substrate via the planar process, surface passivation, thermal oxidation, and/or the like in order to provide a layer of material that shields the optical interposer substrate and is capable of supporting optoelectronic components thereon. The present disclosure contemplates that the passivation layer may refer to a collection of layers that are applied to the optical interposer substrate. The passivation layer may be formed of any material capable of supporting optoelectronic components and may further be dimensioned (e.g., sized and shaped) based upon the intended application of the optical component 100.

A metallic shielding element may be embedded in the passivation layer, such as by being positioned or otherwise disposed between one or more layers that form the passivation layer. The metallic shielding element may, for example, comprise a grounded metallic film that extends through the passivation layer. Said differently, the present disclosure contemplates that the metallic shielding element may be positioned in a plane substantially parallel with respect to the first surface and the second surface and may further extend to each of the exterior edges of the body of the optical component. As described above, the metallic shielding element may, in some embodiments as shown in operation 1206, define an integrated lens, a 1D metallic grating, a 2D metallic grating, or a circular metallic grating. The metallic shielding element may be formed of any material that operates to reduce or prevent electromagnetic interference between the first surface and the second surface.

The method 1200 may further include defining an opening extending from the second surface to the optical interposer substrate at operation 1208. As described above, the optoelectronic components supported by the second surface may be configured to generate optical signals. In order for the generated optical signals to pass through the body of the optical component, the optical signals may be directed towards the opening. For example, the opening may extend the thickness of the passivation layer and through the metallic shielding element provided at operation 1204. Although described herein with reference to a cylindrical opening, the present disclosure contemplates that the opening may be dimensioned (e.g., sized and shaped) based upon the intended application of the optical component and/or based upon any optoelectronic component used in conjunction with the opening.

The method 1200 may further include supporting an optical transmitter on the second surface of the body at operation 1210. As described above, the second surface defined by the passivation layer may support the optical transmitter. The optical transmitter may be configured to generate optical signals that may, as described hereafter, travel along an optical path. By way of example, the optical transmitter may include a VCSEL configured to generate optical signals that may be transmitted through the passivation layer via the opening along the optical path. The optical transmitter may be configured to generate optical signals at any wavelength based upon the intended application of the optical component. Although described hereinafter with reference to an optical transmitter (e.g., a VCSEL), the present disclosure contemplates that the optical transmitter may operate as an optical receiver (e.g. photodiode) or optical transceiver configured to receive optical signals. By way of example, an optical signal traveling along the optical path 204 may also be received by an optical transceiver.

The method 1200 may further include supporting an optical coupler on the first surface of the body at operation 1212. As described above, the first surface defined by the optical interposer substrate may support an optical coupler. The optical coupler may, for example, be metallic (e.g., formed via metal stamping or the like) so as to reduce the manufacturing costs associated with this component relative to conventional dielectric couplers. The optical coupler may be positioned relative the optical transmitter of the second surface defined by the passivation layer so as to be substantially aligned with the optical path. In this way, the optical coupler may be in optical communication with the optical transmitter via the optical path. The optical coupler may also support or otherwise be in optical communication with an optical communication medium (e.g., a collection of optical fibers or the like.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of any optical component or optoelectronic element. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical component comprising:
    a body defined by:
        an optical interposer substrate defining a first surface of the body;
        a passivation layer applied to the optical interposer substrate defining a second surface of the body opposite the first surface, wherein the passivation layer comprises a metallic shielding element embedded in the passivation layer configured to prevent interference between the first surface and
    the second surface; and
    an opening extending from the second surface to the optical interposer substrate, the opening defining an optical path through the passivation layer.

2. The optical component according to claim 1, further comprising an optical transmitter supported by the second surface of the body and configured to generate optical signals.

3. The optical component according to claim 2, wherein the optical interposer substrate is configured to receive an optical signal from the optical transmitter via the optical path, and wherein the optical interposer is configured to collimate or shape the optical signal.

4. The optical component according to claim 3, further comprising driving circuitry supported by the second surface of the body and communicably coupled with the optical transmitter via one or more transmission lanes.

5. The optical component according to claim 3, further comprising an optical coupler supported by the first surface of the body and in optical communication with the optical transmitter via the optical path.

6. The optical component according to claim 1, wherein the metallic shielding element further defines an integrated lens positioned within the opening and along the optical path.

7. The optical component according to claim 1, wherein the metallic shielding element further defines a one-dimensional (1D) metallic grating positioned within the opening and along the optical path.

8. The optical component according to claim 1, wherein the metallic shielding element further defines a two-dimensional (2D) metallic grating positioned within the opening and along the optical path.

9. The optical component according to claim 1, wherein the metallic shielding element further defines a circular metallic grating positioned within the opening and along the optical path.

10. A method of manufacturing an optical component, the method comprising:
    providing an optical interposer substrate defining a first surface of a body of the optical component;
    applying a passivation layer to the optical interposer substrate, the passivation layer defining a second surface of the body of the optical component opposite the first surface, wherein the passivation layer comprises a metallic shielding element embedded in the passivation layer configured to prevent interference between the first surface and the second surface; and
    defining an opening extending from the second surface to the optical interposer substrate, the opening defining an optical path through the passivation layer.

11. The method according to claim 10, further comprising supporting an optical transmitter by the second surface of the body, wherein the optical transmitter is configured to generate optical signals.

12. The method according to claim 11, wherein the optical interposer substrate is configured to receive an optical signal from the optical transmitter via the optical path, and wherein the optical interposer is configured to collimate or shape the optical signal.

13. The method according to claim 12, further comprising supporting driving circuitry by the second surface of the body, wherein the driving circuitry is communicably coupled with the optical transmitter via one or more transmission lanes.

14. The method according to claim 12, further comprising supporting an optical coupler by the first surface of the body, wherein the optical coupled is in optical communication with the optical transmitter via the optical path.

15. The method according to claim 10, wherein the metallic shielding element further defines an integrated lens positioned within the opening and along the optical path.

16. The method according to claim 10, wherein the metallic shielding element further defines a one-dimensional (1D) metallic grating positioned within the opening and along the optical path.

17. The method according to claim 10, wherein the metallic shielding element further defines a two-dimensional (2D) metallic grating positioned within the opening and along the optical path.

18. The method according to claim 10, wherein the metallic shielding element further defines a circular metallic grating positioned within the opening and along the optical path.

19. An optical component comprising:
- a body defined by:
  - an optical interposer substrate defining a first surface of the body;
  - a passivation layer applied to the optical interposer substrate defining a second surface of the body opposite the first surface, wherein the passivation layer comprises a metallic shielding element configured to prevent interference between the first surface and the second surface; and
- an opening extending from the second surface to the optical interposer substrate, the opening defining an optical path through the passivation layer,
- wherein the metallic shielding element defines an integrated lens positioned within the opening and along the optical path.

20. The optical component according to claim 19, wherein the metallic shielding element is embedded in the passivation layer.

* * * * *